United States Patent
O'Neil

[11] Patent Number: 5,635,092
[45] Date of Patent: Jun. 3, 1997

[54] CONTROLS FOR ELECTRICALLY HEATED WATER BOILING VESSELS

[75] Inventor: Robert A. O'Neil, Buxton, Great Britain

[73] Assignee: Otter Controls Limited, Buxton, United Kingdom

[21] Appl. No.: 295,824

[22] PCT Filed: Mar. 10, 1992

[86] PCT No.: PCT/GB93/00500

§ 371 Date: Jan. 21, 1995

§ 102(e) Date: Jan. 21, 1995

[87] PCT Pub. No.: WO93/18631

PCT Pub. Date: Sep. 16, 1993

[30] Foreign Application Priority Data

Mar. 10, 1992 [GB] United Kingdom ............. 9205178

[51] Int. Cl.⁶ .................................................. H05B 1/02
[52] U.S. Cl. ................................................ 219/441; 219/437
[58] Field of Search ................................. 219/435, 437, 219/441, 442

[56] References Cited

U.S. PATENT DOCUMENTS

| 3,513,292 | 5/1970 | Sano et al. | 219/331 |
| 4,621,186 | 11/1986 | Taylor et al. | 219/330 |
| 4,730,099 | 3/1988 | Bleckman | 219/441 |
| 5,408,579 | 4/1995 | Hunt | 392/498 |

FOREIGN PATENT DOCUMENTS

| 85 34 008.1 | 3/1986 | Germany . |
| 1095161 | 12/1967 | United Kingdom . |
| 1143834 | 2/1969 | United Kingdom . |
| 2044590 | 10/1980 | United Kingdom . |

Primary Examiner—Teresa J. Walberg
Assistant Examiner—J. Pelham
Attorney, Agent, or Firm—Hopgood, Calimafde, Kalil & Judlowe

[57] ABSTRACT

Described is an electric immersion heating element for a water boiling vessel which has a single thermal sensor which protects the element against overheating by switching on and off dependant on dryness and water boiling conditions.

12 Claims, 2 Drawing Sheets

CONTROLS FOR ELECTRICALLY HEATED WATER BOILING VESSELS

FIELD OF THE INVENTION

This invention concerns improvements relating to controls for electrically heated water boiling vessels such as electric kettles and hot water jugs and also including pots, pans, urns, laboratory equipment etc. Whilst the present invention has particular application to electric kettles and hot water jugs and will be described in the following with reference to such application, it is not limited to such an application.

BACKGROUND OF THE INVENTION

Automatic electric kettles and hot water jugs are conventionally provided with two thermal controls, namely an element protector control adapted to switch off the supply of power to the electric heating element of the appliance in a sensed overtemperature situation resulting from the appliance being switched on empty for example, and a steam control for reducing or switching off the supply of power to the heating element when the water being heated boils. Such controls generally have their own thermal sensors, commonly a bimetallic element, and the element protector control may further include some form of secondary or back-up protection arranged to operate in the event, however unlikely, of failure of the primary control. An exemplary element protector control is the X1control manufactured by Otter Controls Ltd. and substantially as described in GB-A-2194099 with reference particularly to FIGS. 3A, 3B and 3C thereof, and an exemplary steam control is the J1control manufactured by Otter Controls Ltd. and substantially as described in GB-A-2212664 with reference particularly to FIGS. 3A to 3M thereof.

A single sensor electronic control for a water boiling vessel is described in GB-A-2228634. This control utilizes a thermistor and senses element temperature as a function of the electrical resistance of the thermistor and the onset of boiling as a function of the rate of change of the thermistor resistance. However, even with the current state of modern electronics a circuit capable of switching a mains load cannot readily be manufactured at a price competitive with bimetallic controls.

A single sensor control is proposed in GB-A-1 143 834 (Matsushita) but has never been manufactured, so far as we are aware. According to this proposal, a sheathed, insulated, resistance heating element mounted to a head plate, providing for mounting of the element in a kettle or other water boiling vessel, has the heating element proper bent to define a hot return portion which is attached to the element head plate at a location above the general level of the major part of the heating element, and an apertured enclosure is provided on the element head plate in the region where the element hot return portion attaches thereto. The provision of a hot return element portion which attaches to the element head at a level above the major part of the heating element proper was conventional at the time of filing of GB-A-1 143 834, this arrangement ensuring that if a non-automatic kettle is accidentally left to boil dry the hot return part of the element will be exposed first as the water level drops and will consequently overheat thereby providing a thermal signal through the element head to a bimetallic or other control provided on the opposite side thereof. By this means the element can be switched off before any substantial part of the element seriously overheats. By enclosing the hot return part of the element within an enclosure provided with small openings sufficient to admit water to the interior of the enclosure when the kettle is cold, the proposal of GB-A-1 143 834 was that the steam generated within the enclosure on boiling would drive the water from the enclosure whereupon the hot return portion of the element would overheat and cause the bimetallic or other control to operate. In accordance with the arrangement proposed in GB-A-1 143 834, a single bimetallic or other control will operate both when a kettle boils and when a kettle is switched on dry.

As mentioned above, the proposal of GB-A-1 143 834 has not to our knowledge ever been manufactured despite its apparent simplicity and the promised advantage of a single sensor bimetallic control providing both element overtemperature protection and boil sensing. Furthermore, in tests that we conducted we found it impossible with a heating element as described in GB-A-1 143 834 to achieve a sufficient temperature rise on boiling to reliably operate a thermal actuator. Such an actuator, it is to be understood, has to be able to discriminate between the temperatures experienced during normal heating, which may be elevated by lime scale for example, and the temperature experienced when the water boils.

OBJECTS AND SUMMARY OF THE INVENTION

It is the object of the present invention to overcome or at least substantially reduce the abovedescribed problems of the arrangement described in GB-A-1 143 834.

According to the present invention in one of its aspects there is provided the combination of a stainless steel sheathed heating element having a hot return portion spot welded to a stainless steel head plate and with an enclosure provided around the hot return portion such as to cause the temperature of the hot return portion to rise significantly above 100° C. when in use of the element water is boiled in an associated vessel and steam generation within the enclosure expels water therefrom, and a thermally-responsive control adapted to switch off the supply of electric power to the element when the element head plate temperature reaches a predetermined level, the control being adapted and arranged to be responsive to the temperature of the element head plate substantially at the location of said spot weld.

The invention also extends to a stainless steel sheathed heating element as above defined for use in such a combination.

Having given careful consideration to the results of the tests aforementioned, we arrived at the conclusion that failure of the tests to produce satisfactory results might be due to our use in the tests of conventional copper sheathed heating elements brazed to brass head plates, the high thermal conductivity of the element sheath possibly causing the hot return portion of the element within the enclosure to be cooled by heat transfer into the water at 100° C. outside of the enclosure.

In an attempt to achieve a successful arrangement generally in accordance with the teachings of GB-A-1 143 834 and in order to test the conclusion that we arrived at following the failure of our tests utilizing conventional copper sheathed elements with brass head plates, we performed further experiments using a stainless steel sheathed element having a stainless steel head plate. Stainless steel sheathed elements are known in which the hot return portion of the element proper is brazed to the stainless steel head plate, though such elements are not popular with element manufacturers on account of difficulties that are experienced with stainless steel in brazing the hot return to the head plate.

We conducted our experiments using an X1 control as aforementioned in conjunction with the element head and with a high thermal conductivity heat sink compound provided, as is conventional, between the bimetal blade of the X1 control and the rear of the element head plate in the region thereof where, on the other side of the head, the hot return portion of the element contacts the head.

We were unable to obtain satisfactory results from our experiments until we made the following two changes:

(i) we replaced the brazed area conventionally utilized to couple the element return portion of the heating element to the element head plate by a highly localized spot weld; and (ii) we restricted application of the heat sink compound between the bimetal blade of the X1 control and the rear of the element head to the small area of the spot weld.

By making these changes, we were able to obtain temperatures of up to 180° C. at the bimetal within a period of 30 seconds following the initiation of boiling of the water in the vessel and this was fully sufficient to cause reliable operation of the X1 control.

When heat sink compound was applied more liberally to the bimetal blade of the X1 control, as would be conventional for use of the X1 control solely as an element protector, a temperature rise of the bimetal to around only 120° C. was seen, somewhat slowly, following boiling of the water, and investigation of the blade temperature remote from the spot weld using a thermocouple did not reveal temperatures above 100° C. It thus seems clear that the low thermal conductivity of stainless steel is particularly advantageous in the application of the present invention, firstly as regards restriction of the flow of heat to the region of the element sheath immediately outside of the enclosure where the water is boiling at a relatively cool 100° C. thereby enabling the sheath temperature at the spot weld to rise much higher, and secondly as regards concentration of the heat from the hot return portion of the element to a very restricted region of the element head plate in the immediate vicinity of the spot weld, thereby limiting the amount of heat needed to achieve a satisfactory temperature rise and allowing a suitably arranged thermal actuator to react quickly to switch off the kettle upon boiling.

Whilst stainless steel is the presently preferred material for the heating element sheath and for the element head plate, on account of the remarkably low thermal conductivity of stainless steel, other materials having a low thermal conductivity as compared to copper or brass, such as a nickel-silver or cupro-nickel alloy for example, could possibly be utilized in the practice of the present invention. Furthermore, whilst it is preferred to spot weld the hot return portion of the element to the element head plate, other means of providing the requisite highly localized securement of the hot return to the head plate could possibly be used, including localized brazing or silver soldering, and seam welding of various kinds including argon arc welding and laser beam welding. The heat of the hot return portion of the element could also be transferred to the sensor by means of a high thermal conductivity link passing through the element head.

The enclosure may be formed as a rectangular box having an open face adapted to adjoin the element head plate and having slots at opposed sides to permit the element to enter. The box desirably should be as wide in its horizontal and vertical dimensions, parallel to the general plane of the element head plate, as can conveniently be accommodated by the head plate, and the depth of the enclosure, perpendicular to the head plate, may be about 1.5 times the element sheath diameter. The enclosure may be fixed to the head plate by means of two spot welds on flanges formed at the vertical sides of the enclosure, for example, or may alternatively be designed to be clipped onto the element sheath and to fit snugly against the element head plate though without any attention made to achieving a water tight seal. The enclosure desirably should cover as long a length of the element sheath as is practical, having regard to the size of the element head plate, in order to increase the heat path between the hot return join to the element head plate and the water boiling at 100° C. outside of the enclosure and thereby avoid "cooling" of the join by the water at 100° C. Water desirably should only be allowed to enter the enclosure at the points where the element passes through the walls of the enclosure, since such water would then be evaporated by the heat of the element before it could reach and cool the hot return join, and whilst this may not economically and inexpensively be achieved without use of undesirable seals it should be a design feature to restrict undesired leakage of water into the enclosure.

The invention as generally described in the foregoing will hereinafter be further explained by reference to an exemplary embodiments which are illustrated in the accompanying drawings.

DETAILED DESCRIPTION OF THE EMBODIMENTS

Figure 1:
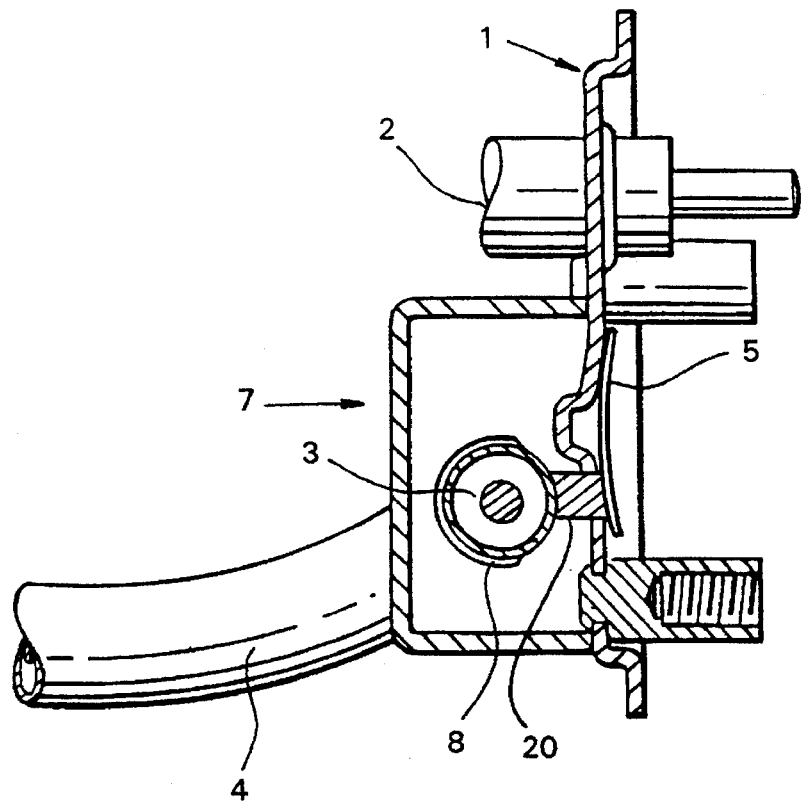
FIG. 1 shows a sectional side elevation view of the element head portion of a heating element provided with an enclosure about its hot return portion.

Referring first to FIG. 1, an electrical heating element is shown therein which, apart from the provision of an enclosure about the hot return portion of the element, is substantially conventional in that an element head plate 1 supports a sheathed resistance heating element 2 which, as is well known, loops back towards the head plate 1 and defines a hot return element portion 3 which attaches to the head plate 1 at a level above the level of the main part 4 of the element. As mentioned hereinbefore this arrangement ensures that in a situation where an associated non-automatic water boiling vessel is left unattended and allowed to boil dry, the elevated hot return element portion 3 will be exposed above the liquid level before the bulk of the element is exposed and will locally overheat (since it will not be cooled by the boiling water) so as to provide a thermal signal to and through the element head plate 1. On the dry side of the head plate 1 an illustrative bimetallic element 5 forming part of an element protector control (not shown) responds to this thermal signal to switch off the electrical power supply to the heating element. As aforementioned, the element protector control may for example be an X1 control manufactured by Otter Controls Ltd.

Figure 3:
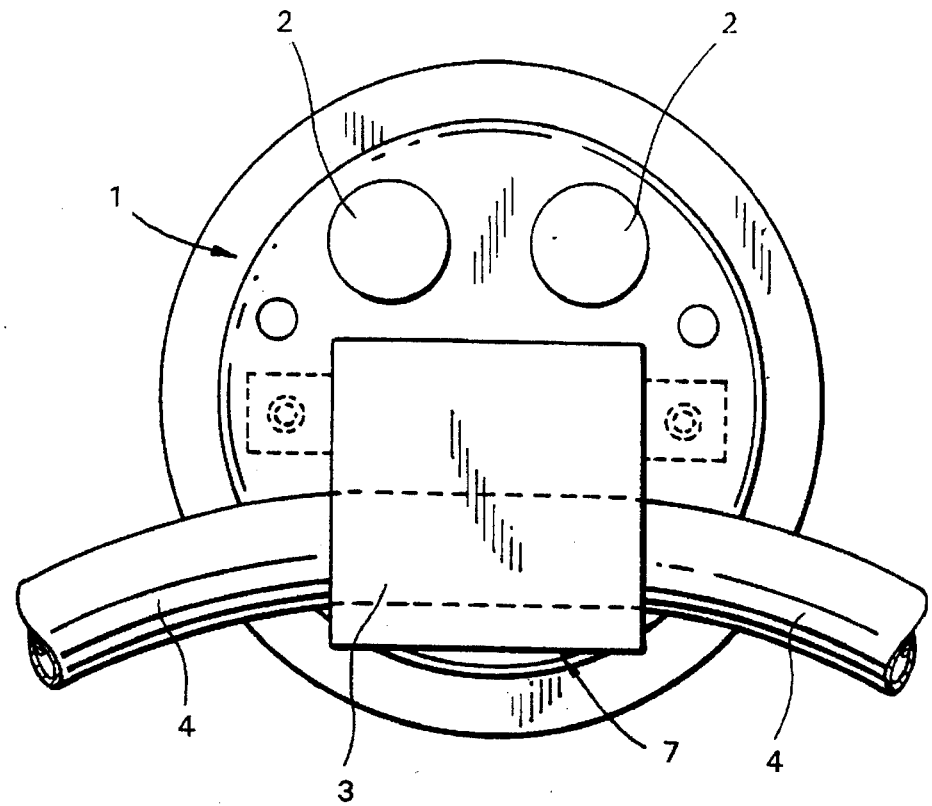
FIG. 3 shows a front elevation view of the element head portion providing further details of the arrangement of the enclosure.

In accordance with the teachings of the present invention, the sheath of the heating element 2 is formed of stainless steel, the element head plate 1 is formed of stainless steel, and the hot return portion of the heating element is secured to the element head plate by means of a small area spot weld 6 located at a point on the element head plate where the bimetallic element 5 is in close thermal contact with the head plate. A small amount of heat sink compound will, in use of the element arrangement thus described, be provided between the element head plate 1 and the bimetallic element 5 at the location of the spot weld to ensure efficient heat transfer from the hot return portion of the element, through the region of the spot weld 6 and into the bimetallic element. Further in accordance with the teachings of the present invention, an enclosure 7 is provided over the hot return portion of the heating element, the enclosure being formed to make a snug fit with the front surface of the element head plate 1 without having to make an airtight or watertight seal thereto and having side walls formed to define small gaps 8 around the heating element where it passes through the walls. The enclosure 7 may, as shown, be formed to be an interference or push fit onto the heating element, or alternatively may be designed to be affixed thereto by spot welding of tabs provided on the enclosure to the element head plate as schematically shown in FIG. 3.

In operation of the thus described element and element protector combination, the enclosure 7 will fill with water when a vessel to which the element is fitted is filled. As the water is heated towards boiling, the situation will arise that steam generated by water boiling within the enclosure will expel the water from the enclosure thereby permitting the temperature of the element portion within the enclosure to rise rapidly above 100° C. since it is no longer "cooled" by the water. This temperature rise is transferred through the head plate in the region of the spot weld 6 and will cause the bimetallic element 5 to snap to its opposite condition thereby causing the X1 control to switch off the supply of electricity to the heating element. The arrangement will thus operate to switch off the heating element when water boils in the vessel in the same way as it would operate to switch off the heating element if it were to be turned on without any water in the vessel (a so-called dry boil situation). A single element protector control thus, in the described arrangement, provides dry boil protection and also automatically switches off the element when water boils in the vessel.

Figure 2:
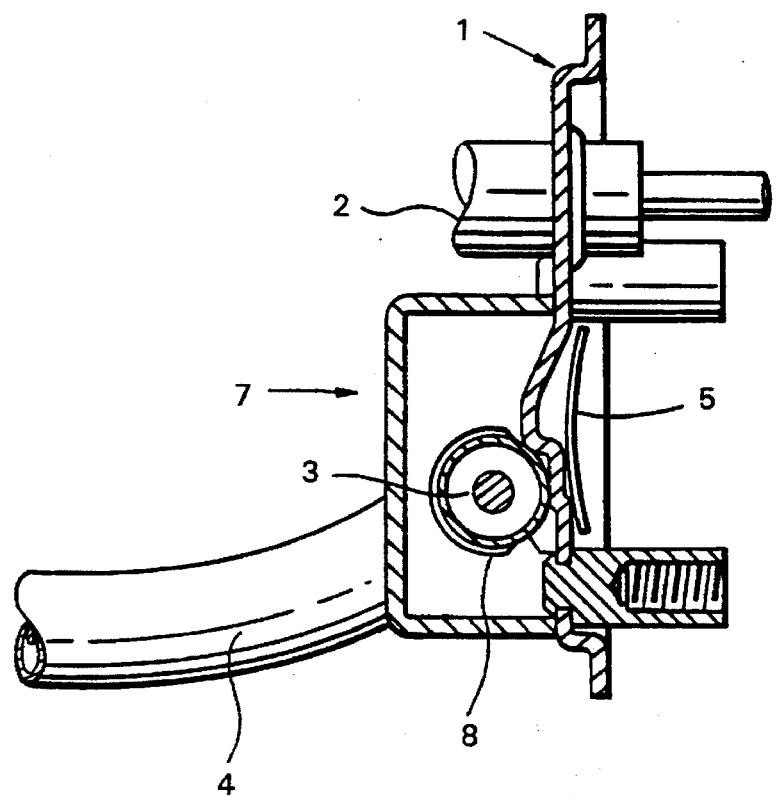
FIG. 2 shows a modification of the arrangement of FIG. 1.

The cross-sectional profile of the heating element head plate 1 as shown in FIG. 1 is the same as the profile that is normally used with an X1 control. An alternative profile is shown in FIG. 2 and, as will be seen, the upper part of the bimetallic element 5 is distanced from the head plate. As previously described herein, the arrangement of the present invention provides highly localized heat transfer through the element head plate and the alternative element profile shown in FIG. 2 ensures that the heat that is transferred through the element head plate when water is boiled by the element is concentrated in the appropriate small region of the bimetallic element responsible for causing it to switch.

Figure 4:
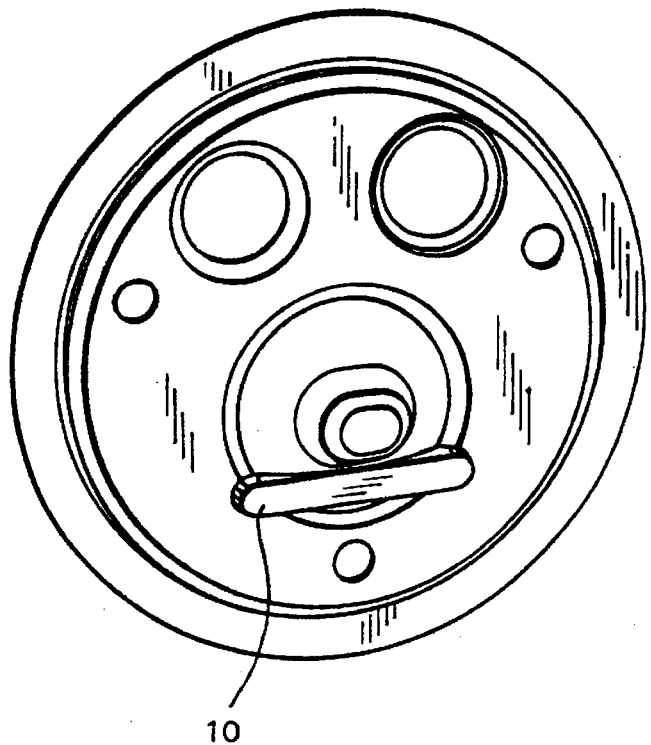
FIG. 4 shows a front elevation view of a modified form of the element head plate.

The invention is not limited to the provision of a single spot weld securing the hot return portion of the heating element to the element head plate. The requirement in this regard is to conduct the high temperature that is developed in the hot return portion of the element, when water is boiled, through the element head plate to the bimetallic element in an efficient manner despite the low thermal conductivity of the stainless steel or other material from which the parts are made. The hot return portion of the heating element may be constructed so as to make a linear contact with the element head plate, as opposed to a point contact, and the bimetallic element could similarly be arranged to make a corresponding linear contact with the relevant part of the element head plate. FIG. 4 shows an element head plate provided with a formation 10 enabling linear connection to the element hot return portion. With such an arrangement, a plurality of spot welds could be provided for securing the hot return portion of the element to the element head plate or an equivalent linear or seam weld could be employed. Brazing or soldering of the hot return portion of the element to the element head plate could even be employed so long as the braze or solder material was not applied to excess so as to cause the temperature rise of the element hot return portion to be too widely dissipated.

By use of an X1 control in an arrangement as described in the foregoing, without modification of the X1, there would be no on/off switching facility since the bimetal in the X1 control would cycle between its hot and cold conditions. This could be achieved by use of a modified X1 control with a modified J1 control in which the bimetal of the J1 control was replaced by a simple spring, the push rod in the X1 being arranged to operate the trip lever of the modified J1 by being coupled thereto via an appropriate mechanical linkage. When the bimetallic element in the modified X1 operated in response to boiling of water in an associated vessel, it would cause the modified J1 to open its switch contacts thus interrupting the power supply to the heating element. On manual resetting of the J1, the trip lever of the J1 will transfer its movement through the mechanical linkage to the push rod of the X1 and will reset the bimetallic element of the X1. With such an arrangement, the primary contacts in the X1 could be omitted, whilst the secondary contacts would function as normal. In a more radical redesign of the X1 control, the operations of the modified X1/J1 combination abovedescribed could all be effected within one control provided with an appropriate linkage, for example a Bowden cable, to allow operation of the control from a remotely positioned rocker knob or other manual operating means.

I claim:

1. An electric heating element for a water boiling vessel, the element comprising a head plate and a sheathed heating element proper having a hot return portion affixed to the head plate, the head plate and the sheath of the element proper being formed of a material having a low thermal conductivity as compared to copper or brass and the hot return portion of the element proper being affixed to the head plate by means of a highly localized fixation, and an enclosure provided around the hot return portion, the enclosure being such as to admit water thereto when a vessel fitted with the element is filled and such that water will be expelled therefrom by steam generation when the water is boiled, wherein the highly localized fixation of the hot return portion of the element proper to the head plate comprises a high thermal conductivity link passing through the head plate.

2. An electric heating element as claimed in claim 1 wherein the head plate and the sheath of the element proper are formed of stainless steel or of a nickel-silver or cupronickel alloy.

3. An electric heating element as claimed in claim 1 wherein the enclosure is such that water is admitted thereto substantially only at the points where the sheathed heating element proper passes through the walls of the enclosure.

4. An electric heating element as claimed in claim 1 in combination with a thermal sensor arranged to be responsive to the temperature of the element head plate at a highly localized region of the side thereof which is opposite to the side whereto the hot return portion of the element proper is affixed and corresponds to the location of said highly localized fixation.

5. A combination as claimed in claim 4 wherein said thermal sensor comprises a bimetallic element.

6. A combination as claimed in claim 4 wherein said thermal sensor is arranged to be responsive to a predetermined temperature rise at said highly localized region of the element head plate to switch off the supply of power to the heating element.

7. A combination as claimed in claim 5 wherein the bimetallic element is located closely adjacent to the element head plate with a small quantity of heat sink compound thermally coupling said highly localized region of the head plate to the bimetallic element.

8. An electric heating element for a water boiling vessel, the element comprising a head plate and a sheathed heating element proper having a hot return portion affixed to the head plate, the head plate and the sheath of the element proper being formed of a material having a low thermal conductivity as compared to copper or brass and the hot return portion of the element proper being affixed to the head plate by means of fixation to a highly localized region;

a bimetallic thermal sensor arranged to be responsive to the temperature of the head plate at said highly localized region of the side thereof which is opposite to the side whereto the hot return portion of the element proper is affixed, wherein the bimetallic thermal sensor is located closely adjacent to the head plate with a heat sink compound thermally coupling said highly localized region of the head plate to the bimetallic thermal sensor; and an enclosure provided around the hot return portion, the enclosure being such as to admit water thereto when a vessel fitted with the element is filled and such that water will be expelled therefrom by steam generation when the water is boiled.

9. An electric heating element as claimed in claim 8 wherein the highly localized fixation of the hot return portion of the element proper to the head plate comprises a spot weld.

10. An electric heating element as claimed in claim 8 wherein the head plate and the sheath of the element proper are formed of stainless steel or of a nickel-silver or cupro-nickel alloy.

11. An electric heating element as claimed in claim 8 wherein the enclosure is such that water is admitted thereto substantially only at the points where the sheathed heating element proper passes through the walls of the enclosure.

12. An electric heating element as claimed in claim 8 wherein said thermal sensor is arranged to be responsive to a predetermined temperature rise at said highly localized region of the element head plate to switch off the supply of power to the heating element.

* * * * *